US006886968B1

(12) United States Patent
Hamelink et al.

(10) Patent No.: US 6,886,968 B1
(45) Date of Patent: May 3, 2005

(54) HITCH ILLUMINATION APPARATUS

(76) Inventors: Lawrence Robert Hamelink, 3174 Rosco, Hamilton, MI (US) 49419; Scott Thomas Williams, 1991 Wendy Way, Holland, MI (US) 49424

( * ) Notice: Subject to any disclaimer, the term of this patent is extended or adjusted under 35 U.S.C. 154(b) by 108 days.

(21) Appl. No.: 10/462,321

(22) Filed: Jun. 16, 2003

Related U.S. Application Data

(60) Provisional application No. 60/388,366, filed on Jun. 14, 2002.

(51) Int. Cl.[7] .............................................. B60Q 1/00
(52) U.S. Cl. ...................... 362/485; 340/431; 280/163; 280/491.2
(58) Field of Search ........................ 362/485; 280/163, 280/491.2; 340/431

(56) References Cited

U.S. PATENT DOCUMENTS 6,439,589 B1 * 8/2002 Payne ......................... 280/163

6,783,266 B2 * 8/2004 McCoy et al. .............. 362/485

* cited by examiner

Primary Examiner—Stephen Husar
Assistant Examiner—James W Cranson
(74) Attorney, Agent, or Firm—King & Jovanovic, PLC

(57) ABSTRACT

A hitch illumination apparatus comprising a hitch body assembly, a hitch attachment assembly and a hitch illumination assembly. The hitch body assembly includes a base member and at least one arm member. The base member includes a first end and a second end. The at least one arm member includes a proximal end and a distal end. The proximal end is positioned proximate the first end of the base member. The at least one arm member is pivotable relative to the base member. The hitch attachment assembly includes a hitch attachment member and a hitch body attachment member. The hitch attachment member is capable of attachment to an existing hitch. The hitch body attachment member is capable of attachment proximate the second end of the base member. The hitch illumination assembly includes at least one lamp associated with the second end of the base member. The hitch illumination assembly includes at least one clamp that is associated with the second end of the at least one arm member.

18 Claims, 9 Drawing Sheets

US 6,886,968 B1

HITCH ILLUMINATION APPARATUS

CROSS REFERENCE TO RELATED APPLICATION

This application claims the benefit of U.S. Provisional Patent Application Ser. No. 60/388,366 entitled "Device which is attached to a vehicle hitch draw bar or a trailer frame and contains a plurality of illumination devices which are adjustable in their vertical and lateral positions as well as their beam pattern aim" filed Jun. 14, 2002, which is hereby incorporated herein by reference in its entirety.

BACKGROUND OF THE INVENTION

1. Field of the Invention

The present invention relates in general to a hitch illumination apparatus, and more particularly, to a hitch illumination apparatus which is capable of attachment to a hitch draw bar, trailer framework, and/or the like which includes adjustable illumination devices to facilitate illumination of areas surrounding the hitch, trailer and/or associated vehicle.

2. Background Art

Often times it is necessary to utilize a vehicle in the evening and/or in conditions when the presence of light is insufficient. While it is common for vehicles to include front headlights and a plurality of inner lights, the rear as well as the sides of vehicles are generally not well illuminated. To be sure, such a lack of illumination can be problematic. For example, a vehicle user may experience a flat tire during evening hours (i.e. after dusk, before dawn, etcetera). Moreover, a vehicle user may attempt to engage, disengage, operate, or otherwise work behind a hitch of a vehicle and/or associated trailer wherein illumination sources such as flashlights and/or lamps are required.

One problem with such illumination devices is that they are difficult to couple to the vehicle. As such, if the vehicle is moved, the light must be separately moved, or, under certain circumstances, it can become damaged. Certain solutions have overcome such problems by mounting lights to tailgates, bumpers and/or hitches. While such lights represent an improvement over conventional lighting solutions, problems, nevertheless, remain persistent. In particular, and due to vehicle configurations, such attached lights are often positioned in remote locations wherein illumination is substantially reduced, or, in some cases completely compromised. In other applications, the lights are difficult to adjust, and often require the movement of the vehicle. In yet other configurations, the lights are rigidly fixed to the vehicle, and, in turn, incapable of releasable engagement and/or releasable operation.

Accordingly, it is an object of the present invention to provide a hitch illumination apparatus which provides efficient illumination in otherwise sparsely illuminated locations.

It is another object of the present invention to provide an illumination system which is capable of releasable attachment with a trailer hitch and/or other vehicle structure.

These objects and other objects of the present invention will become apparent in light of the present specification, claims, and drawings.

SUMMARY OF THE INVENTION

The present invention is directed to a hitch illumination apparatus comprising a hitch body assembly, a hitch attachment assembly, and a hitch illumination assembly. The hitch body assembly includes a base member and at least one arm member. The base member includes a first end and a second end. The at least one arm member includes a proximal end and a distal end. The proximal end is positioned proximate the first end of the base member. The at least one arm member is pivotable relative to the base member. The hitch attachment assembly includes a hitch attachment member and a hitch body attachment member. The hitch attachment member is capable of attachment to an existing hitch. The hitch body attachment member is capable of attachment proximate the second end of the base member. The hitch illumination assembly includes at least one lamp associated with the second end of the base member. The hitch illumination assembly includes at least one clamp that is associated with the second end of the at least one arm member.

In a preferred embodiment, the base member further comprises a first component, a second component and a locking assembly. The first and second components are telescopically associated with each other. The locking assembly is capable of releasably locking the first and second components in a desired telescopic position.

In another preferred embodiment, the base member includes a conduit extending at least partially therethrough.

In another preferred embodiment, the cross-sectional configuration proximate the second end of the base member comprises a substantially uniform cross-section. In one embodiment, the cross-sectional configuration proximate the second end of the base member comprises a square cross-section.

In a preferred embodiment, the at least one arm further comprises a proximal component and a distal component. The distal component and the proximal component are telescopically positionable relative to each other. The locking member is capable of releasably retaining the proximal component relative to the distal component.

In another preferred embodiment, the at least one arm further comprises a pair of arms. Preferably, the pair of arms are substantially identically configured.

In a preferred embodiment, a positioning assembly is associated with the at least one arm. The positioning assembly facilitates the positioning of the at least one arm at a plurality of rotatable positions relative to the base member. In one such embodiment, the at least one arm is positionable in at least three rotatable positions relative to the base member. Preferably, the base attachment member comprises a rotation facilitating member, which facilitates the rotation of the base member relative to the base attachment member.

In one preferred embodiment, the lamp includes a plurality of elements, at least one of the plurality of elements is electrically coupled with an existing indicator of a vehicle.

In another preferred embodiment, the invention further includes a remote viewing assembly associated with the hitch body assembly. In one such embodiment, the remote viewing assembly comprises at least one of a mirror and a camera.

Preferably, the at least one lamp is tethered to the at least one arm.

In yet another preferred embodiment, the positioning assembly comprises a damper having a first end associated with the at least one arm, and a second end associated with at least one of the base member and the hitch attachment assembly.

In a preferred embodiment, the hitch attachment member includes a ball and the hitch attachment member is structurally configured to couple with a ball attachment member of a conventional hitch.

In another aspect of the invention, the invention comprises a hitch illumination apparatus. The apparatus includes a hitch body assembly, a hitch attachment assembly, and a hitch illumination assembly. The hitch body assembly includes a base member and at least one arm member. The base member includes a first end and a second end. The at least one arm member includes a proximal end and a distal end. The proximal end is positioned proximate the first end of the base member, and the at least one arm member is pivotable relative to the base member. The hitch attachment assembly is associated with the at least one base member, and the hitch attachment assembly facilitates attachment to an existing hitch. The hitch illumination assembly includes at least one lamp associated with the second end of the at least one arm member.

In yet another aspect of the invention, the invention comprises a hitch illumination apparatus comprising a hitch body assembly, a hitch attachment assembly, and a hitch illumination assembly. The hitch body assembly includes an attachment assembly, a base member, and at least one arm member. The base member includes a first end and a second end. The first end of the base member is coupled with the attachment assembly. The at least one arm member includes a proximal end and a distal end. The proximal end is rotatably coupled with the attachment assembly. The at least one arm member includes a proximal end and a distal end. The proximal end is rotatably coupled with the attachment assembly, to, in turn, facilitate rotational movement of the at least one arm member relative to the base member. The hitch attachment assembly is associated with the at least one base member, and, the hitch attachment assembly facilitating attachment to an existing hitch. The hitch illumination assembly includes at least one lamp associated with the second end of the at least one arm member.

BRIEF DESCRIPTION OF THE DRAWINGS

The invention will now be described with reference to the drawings wherein.

DETAILED DESCRIPTION OF THE INVENTION

Figure 1:
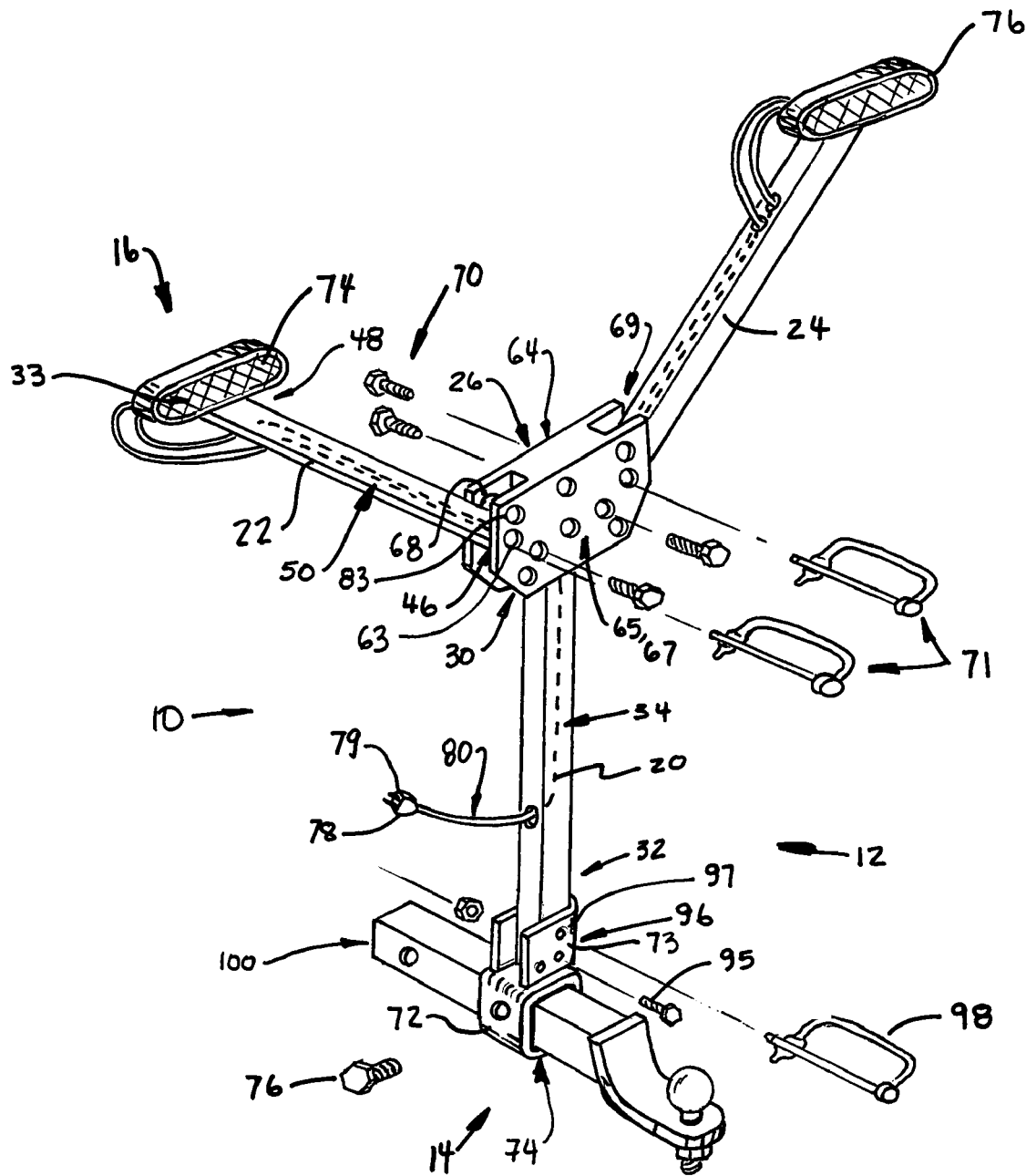
FIG. 1 of the drawings is a perspective view of an embodiment of a hitch illumination apparatus fabricated in accordance with the present invention.

While this invention is susceptible of embodiment in many different forms, there is shown in the drawings and described herein in detail specific embodiments with the understanding that the present disclosure is to be considered as an exemplification of the principles of the invention and is not intended to limit the invention to the embodiments illustrated.

It will be understood that like or analogous elements and/or components, referred to herein, may be identified throughout the drawings by like reference characters. In addition, it will be understood that the drawings are merely schematic representations of the invention, and some of the components may be distorted from their actual scale for purposes of pictorial clarity.

Figure 6:
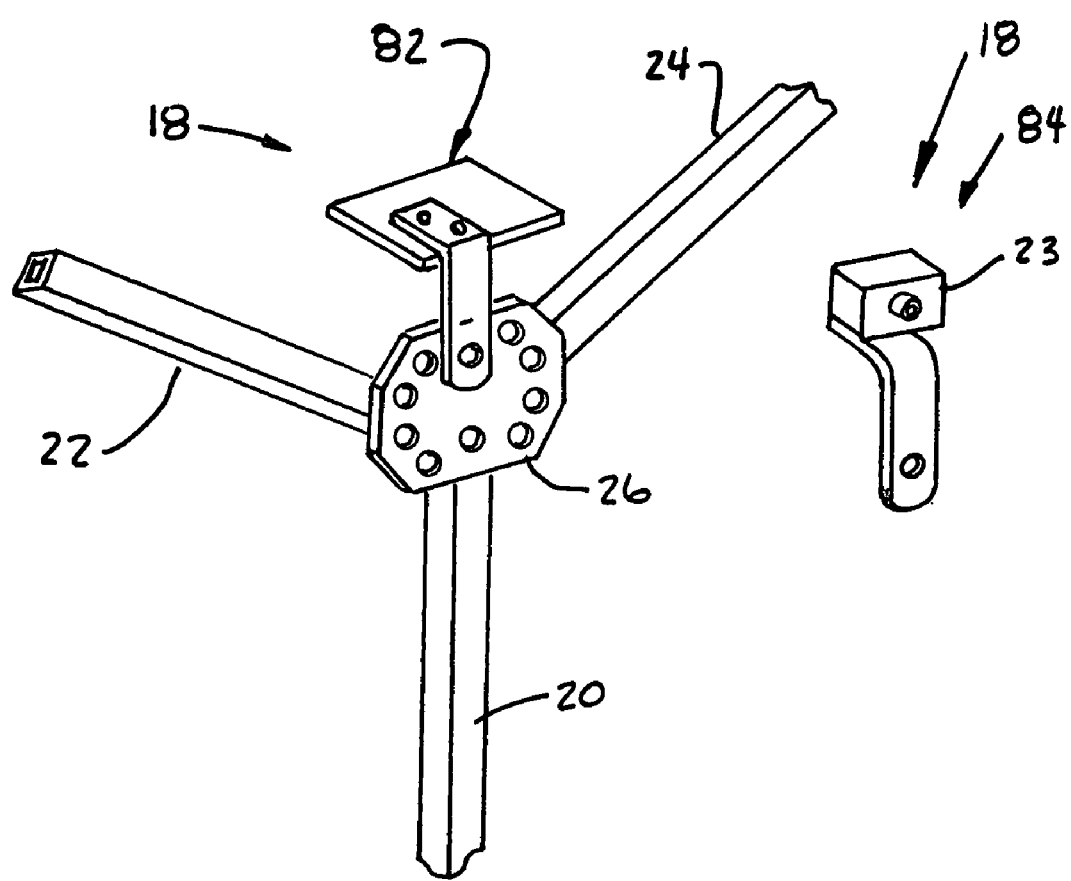
FIG. 6 of the drawings is a partial perspective view of an embodiment of the invention, showing, in particular, a plurality of remote viewing assemblies.
Figure 10:
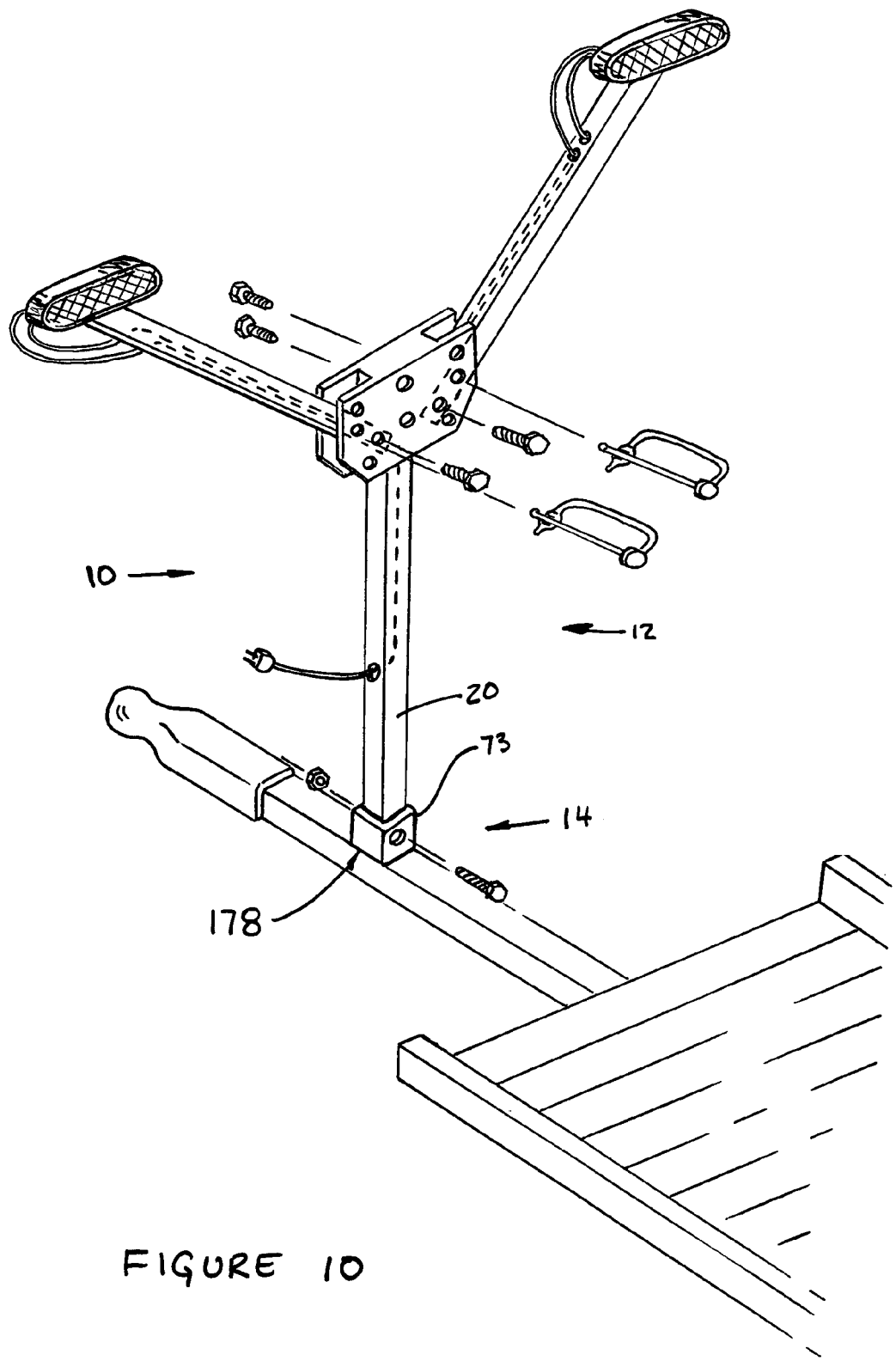
FIG. 10 of the drawings is a partial perspective view of an embodiment of the invention, showing, in particular, an alternate vehicle attachment assembly.

Referring now to the drawings and in particular to FIG. 1, hitch illumination assembly 10 is shown as comprising, hitch body assembly 12, hitch attachment assembly 14, illumination assembly 16 and remote viewing assembly 18 (FIG. 6). Hitch illumination assembly 10 is shown in FIG. 1 as being attached to an existing vehicle hitch 100. It will be understood that the hitch illumination assembly, as is shown in FIG. 10, may be attached to a trailer hitch assembly (i.e., an assembly which is attached to the vehicle hitch). Indeed, these are collectively referred to as a hitch.

Figure 2:
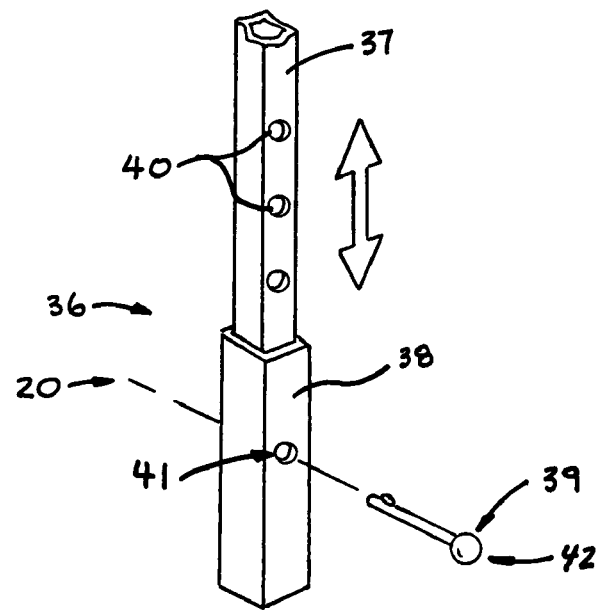
FIG. 2 of the drawings is a partial perspective view of an embodiment of the invention, showing, in particular, a vertical adjustment assembly.

Hitch body assembly 12 is shown in FIG. 1 as comprising base member 20, arm members 22, 24 and joining member 26. Base member 20 includes first end 30, second end 32, conduit 34 and vertical adjustment assembly 36 (FIG. 2). First end 30 is separated from second end 32 by a predetermined distance (i.e., 20" to 30"). Of course, these dimensions are provided with the understanding that other lengths are certainly contemplated, wherein such lengths may be greater than or less than those identified above.

Base member 20 is substantially hollow, thereby defining conduit 34. As will be explained, conduit 34 can be utilized for directing wiring and other items. In one embodiment, the base member comprises square stock with a substantially uniformly square cross-section, and a substantially uniformly square cross-sectional configuration for conduit 34. Any one of a number of different materials can be utilized for base member 20, including, but not limited to, metals, metal alloys, wood, paperboard, polymers, composites and combinations of the foregoing.

With particular reference to FIG. 2, in certain embodiments, vertical adjustment assembly 36 may be provided. Vertical assembly 36 includes upper component 37, lower component 38 and locking assembly 39. Upper component 37 and lower component 38 are substantially configured to facilitate telescopic movement of the two components. In the embodiment shown, the upper component telescopes into and out of the lower component. In turn, movement of the upper and/or lower components relative to each other adjusts the overall length of the base member. Of course it is likewise contemplated that the components may telescope in a side by side orientation.

Locking assembly 39 is shown in FIG. 2 as comprising a plurality of openings, such as openings 40 positioned on upper component 37, openings 41 positioned on lower component 38, and pin member 42. Pin member 42 is capable of extending through each of openings 40 and 41 to, in turn, substantially lock the upper and lower components relative to each other.

It will be understood that arm members 22, 24 are substantially similar in configuration (while not required), and, as such, arm member 22 will be discussed with the understanding that substantially analogous structure is likewise included in arm member 24. In the embodiment shown, the arm members are substantially mirror images of each other taken about an axis defined by the base member.

Figure 3:
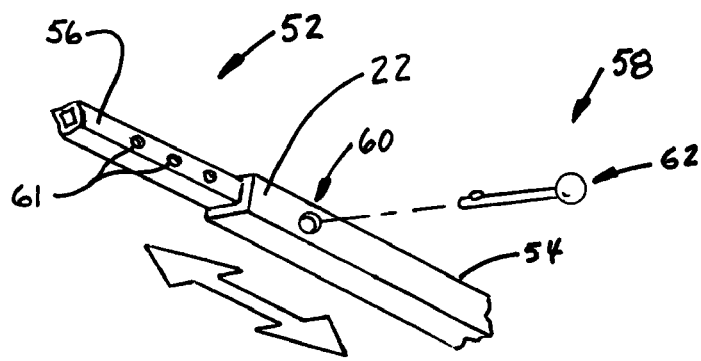
FIG. 3 of the drawings is a partial perspective view of an embodiment of the invention, showing, in particular, a lateral adjustment assembly.

Arm members 22 is shown in FIG. 1 as comprising proximal end 46, distal end 48, conduit 50 and lateral adjustment assembly 52 (FIG. 3). Conduit 50 can be utilized for directing wiring and other items. In one embodiment, the base member comprises square stock with a substantially uniformly square cross-section, and a substantially uniformly square cross-sectional configuration for conduit 50. Materials similar to those selected for base member 20 may be utilized for arm member 22. Of course, the materials chosen for each of the base member and the arm members of a particular embodiment may or may not correspond (i.e., the base member may comprise a first material, whereas the arm member may comprise a second material).

With particular reference to FIG. 3, in certain embodiments, lateral adjustment assembly 52 may be provided. Lateral adjustment assembly 52 includes proximal component 54, distal component 56 and locking assembly 58. Proximal component 54 and distal component 56 are substantially configured to facilitate telescopic movement of the two components. In the embodiment shown, the distal component telescopes into and out of the proximal component. In turn, movement of the proximal and/or distal components relative to each other adjusts the overall length of the arm member. Of course, it is likewise contemplated that the telescoping components may be positioned in a side by side orientation.

Locking assembly 58 is shown in FIG. 3 as comprising a plurality of openings, such as openings 60 positioned on proximal component 54, openings 61 positioned on distal component 56, and pin member 62. Pin member 62 is capable of extending through each of openings 60 and 61 to, in turn, substantially lock the upper and lower components relative to each other.

Figure 7:
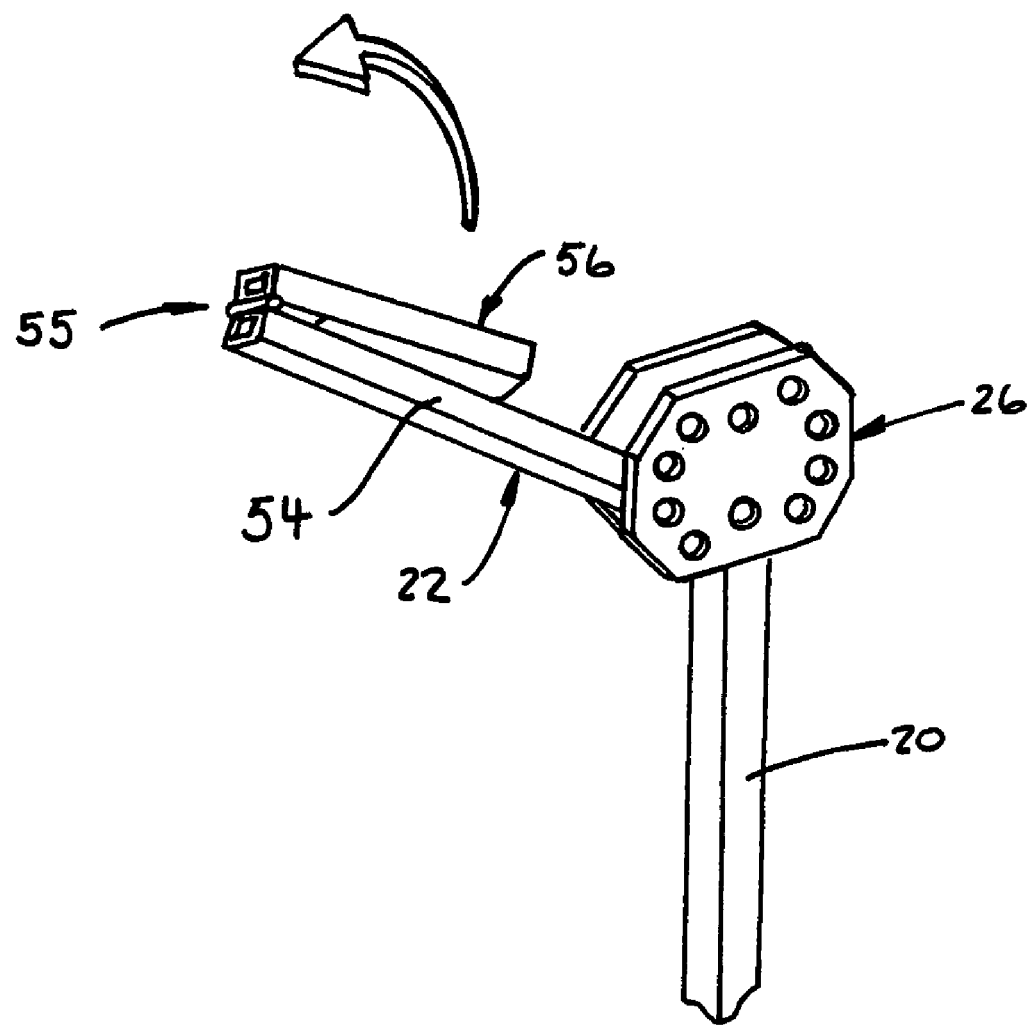
FIG. 7 of the drawings is a partial perspective view of an embodiment of the invention, showing, in particular, an alternate lateral adjustment assembly.

With particular reference to FIG. 7, in another embodiment, lateral adjustment assembly 52 may comprise proximal component 54, distal component 56 and hinge component 55. In such an embodiment, the proximal component and the distal component can be positioned in overlying engagement, whereupon rotation of the two members about hinge component 55 laterally adjusts the length of the arm member. In other embodiments, additional components can be utilized with multiple hinges.

Joining member 26 is shown in FIG. 1 as comprising bracket assembly 64, mating structures, such as mating structure 65, and positioning structures, such as positioning structure 63. Bracket assembly 64 includes base channel 67, and opposing arm channels 68, 69. The opposing arm channels are positioned on opposing sides of the base channel. Base channel 67 is configured for receipt of first end 30. Similarly, opposing arm channels 68, 69 are configured for receipt of the proximal ends of each of the arm members 22, 24, respectively. While the bracket assembly is shown as having two identically shaped plates, it is likewise contemplated that the plates may have shapes that are different relative to each other. It is likewise contemplated that the bracket assembly 64 may comprise a single plate positioned on one side of the base member and arm members, instead of two plates with the members positioned in channels defined thereby.

The mating structure 65 will be discussed relative to the base member, with the understanding that a similar structure is utilized to mate the arms to the bracket assembly. Mating structure 65 includes a plurality of openings extending through base channel 67, a corresponding opening proximate first end 30 of the base member, and fasteners 70. The fastener extends through each of the openings in the base channel and through the openings proximate the first end of the base member, to, in turn, releasably lock the two structures together. A number of different fasteners are contemplated for use, including, but not limited to, pins, plugs, screws, nuts, bolts, nails. It is contemplated that multiple mating structures may be utilized. Alternatively, the base member and the bracket assembly may be welded or adhered together so as to comprise a single unitary design.

Positioning structure 63 will be described relative to arm 22 with the understanding that such a structure can likewise be utilized with respect to each of arm 24 and base member 20. Positioning structure 63 includes registration openings 83 extending through bracket assembly 66 and an opening extending through the proximal end of arm 22. Arm 22 can be rotated about its mating structure until one of the registration openings line up with the opening extending through the proximal end of arm 22. At such time, a locking member, such as locking member 71, can be extended through the aligned openings. Each registration opening, thereby, positions the arm member in a fixed orientation and at a predetermined different position relative to the bracket assembly, and relative to the base member.

Figure 8:
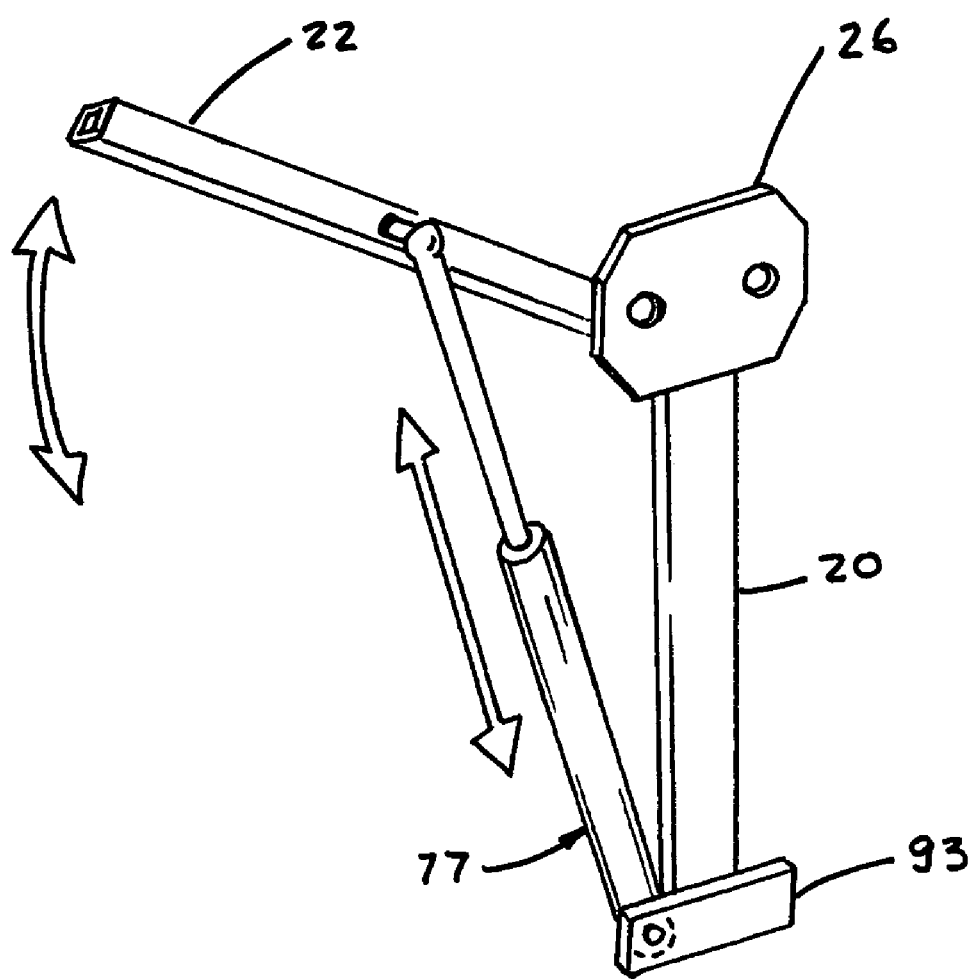
FIG. 8 of the drawings is a partial perspective view of an embodiment of the invention, showing, in particular, an alternate vertical adjustment assembly.

Of course, other positioning structures are contemplated which position the arm member at a particular orientation relative to the base member. Such structures include, but are not limited to, ball and socket joints, pivoting joints, sliding joints and the like. Additionally, and with reference to FIG. 8, it is contemplated that the positioning structure may comprise damper 77 which can be overcome for purposes of adjustment, but which retains a desired configuration upon adjustment. Damper 77 is attached at one end to arm 22 and at the other end to base member 20, either directly or by way of attachment protrusion 93 on the base member. In other embodiments, the damper may be attached to the hitch attachment assembly as well.

Hitch attachment assembly 14 is shown in FIG. 1 as comprising hitch attachment member 72 and base attachment member 73. Hitch attachment member 72 comprises sleeve 74 and locking member 76. Sleeve 74 is configured to slidably receive a conventional trailer hitch therethrough. Locking member 76 comprises a threaded fastener which can extend through an opening in sleeve 74 so as to grasp and releasably retain the underlying hitch. Of course, other locking members, such as biasing springs, clamps and the like are contemplated for use.

Base attachment member 73 is shown as comprising a bracket which is capable of receiving second end 32 of the base member. A plurality of fasteners 95 can be extended through a plurality of registered openings in base member 32 and the bracket of the base attachment member. Additionally, base attachment member includes rotation facilitating assembly 96 which includes registration openings 97 and locking member 98. As will be understood, the base member is capable of rotation from a substantially vertical orientation to a substantially horizontal orientation. In each orientation, locking member 98 can be inserted through registration openings 97 extending through each of the base attachment member and the base member, to in turn, secure the base member in either configuration. Additional registration openings may be provided to facilitate the locking of the base member at angles other than vertical and/or horizontal angles. Advantageously, and with reference to FIG. 4, inasmuch as the cross-sectional configuration of the base member is substantially uniform (while not required), the base member can be inserted into the base attachment member in four distinct orientations.

Figure 4:
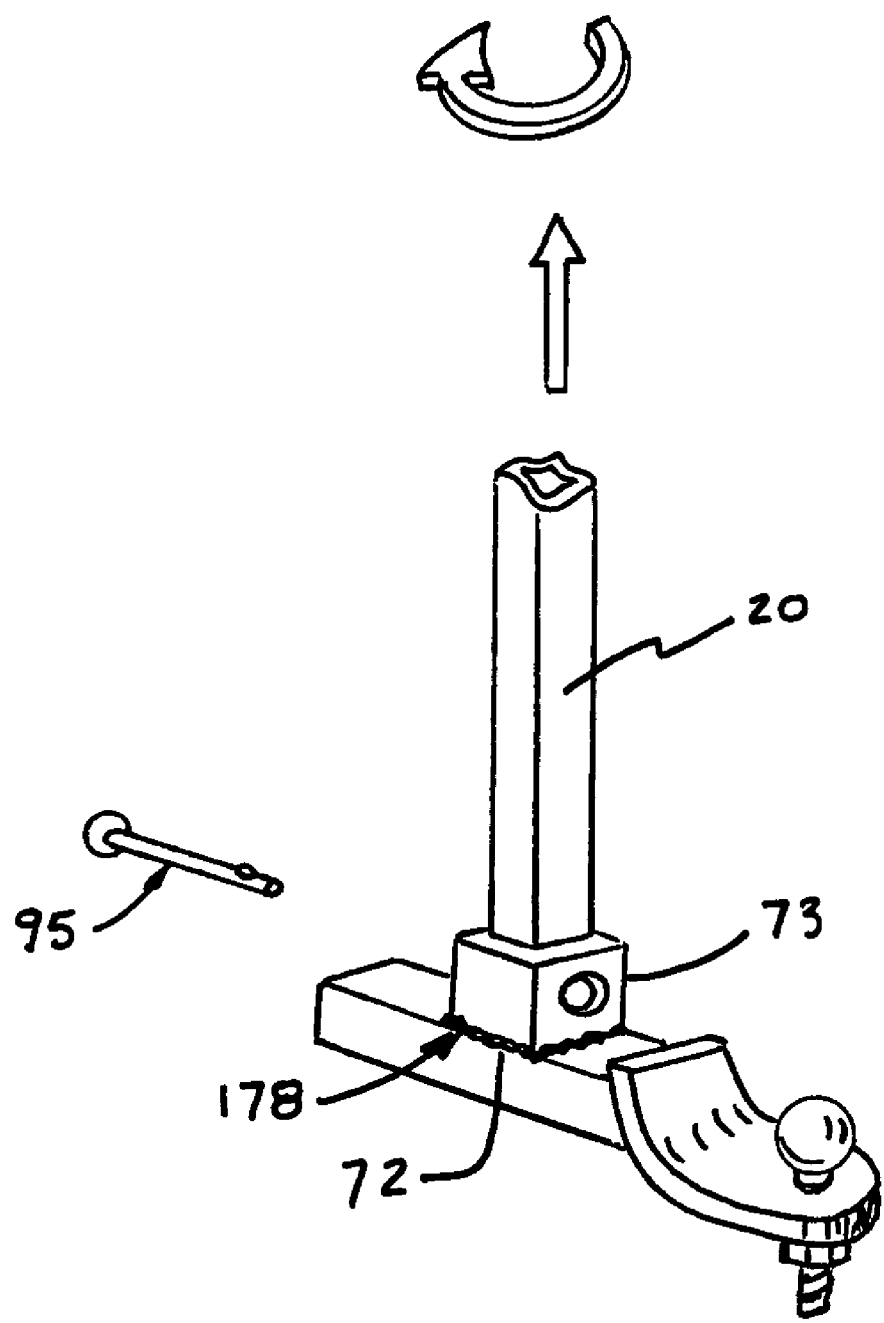
FIG. 4 of the drawings is a partial perspective view of an embodiment of the invention, showing, in particular, a vehicle attachment assembly.
Figure 5:
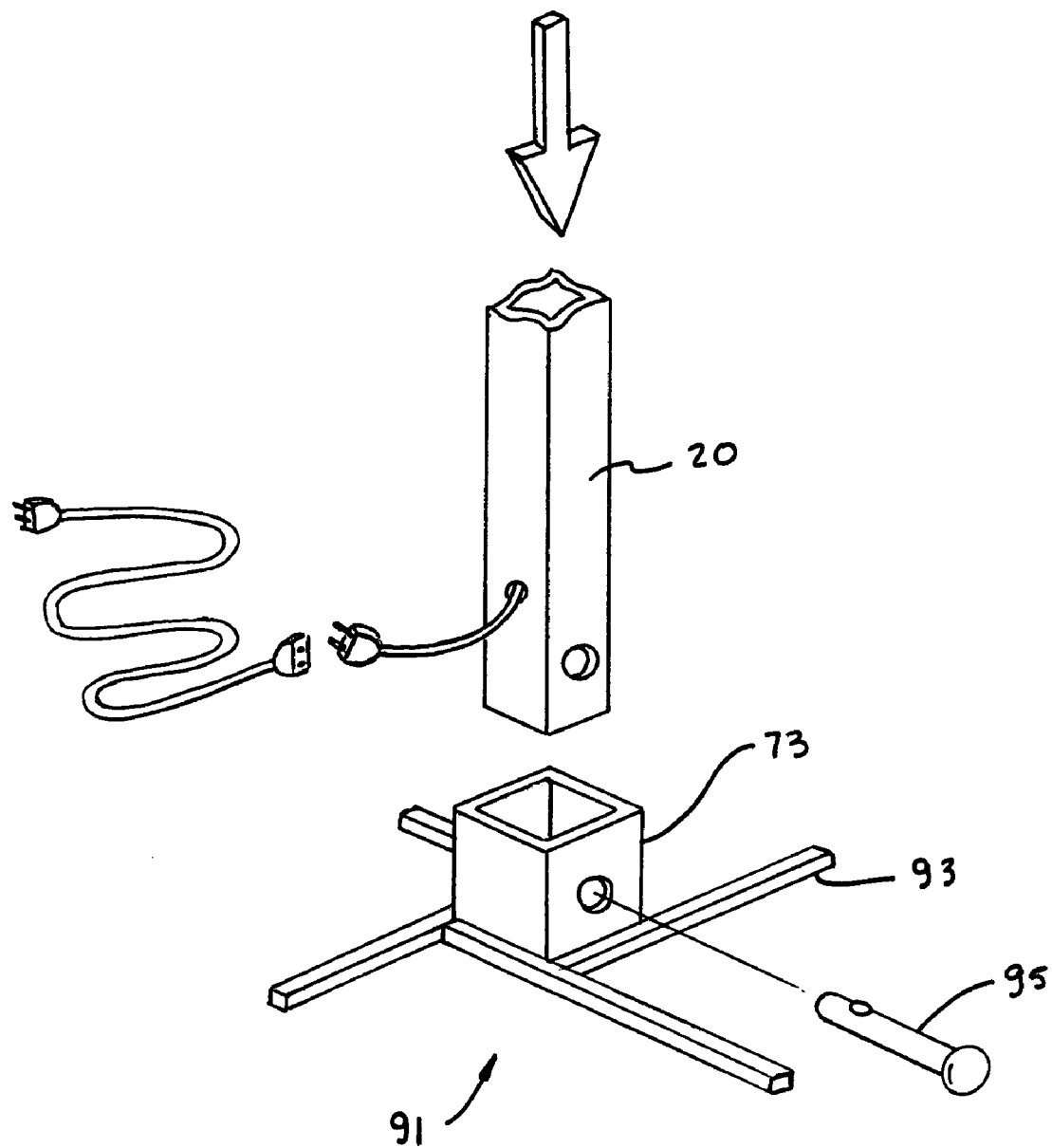
FIG. 5 of the drawings is a partial perspective view of an embodiment of the invention, showing, in particular, a remote stand for use therewith.
Figure 9:
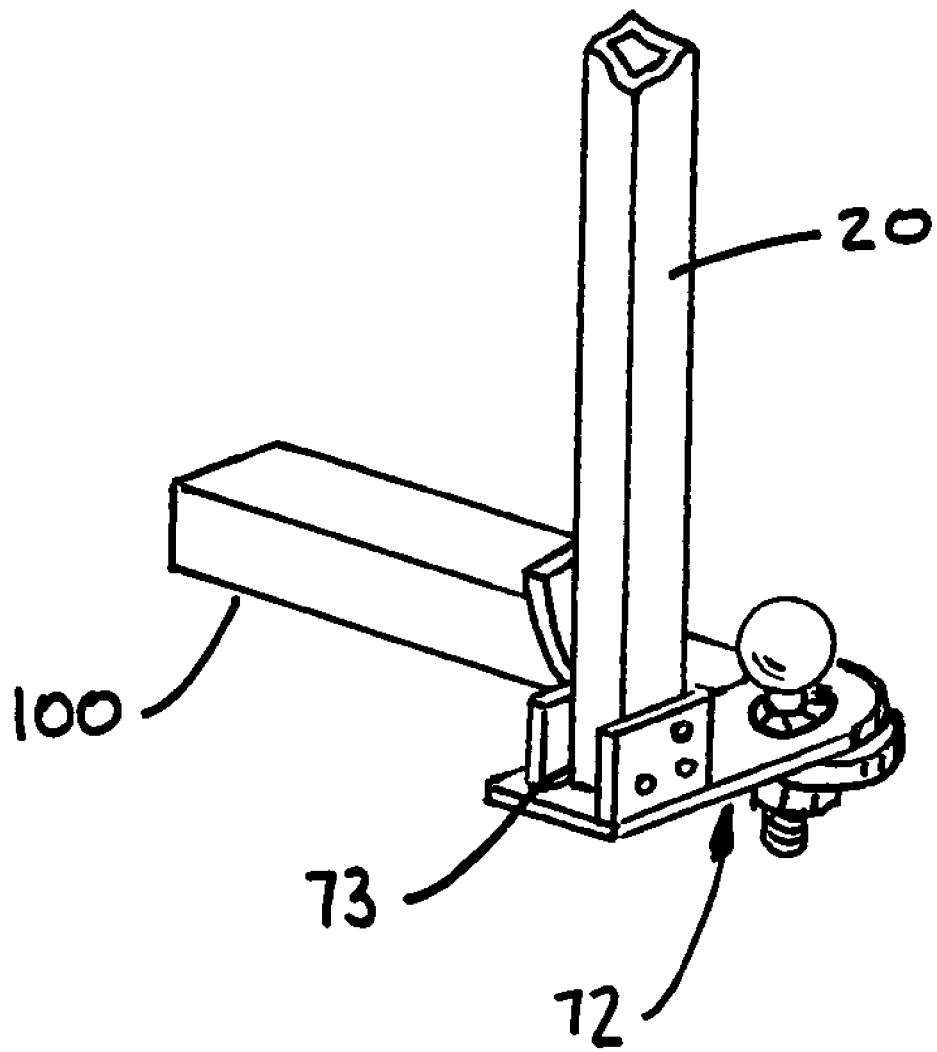
FIG. 9 of the drawings is a partial perspective view of an embodiment of the invention, showing, in particular, an alternate vehicle attachment assembly.

Of course, other structures are likewise contemplated to facilitate attachment to a hitch. For example, as shown in FIGS. 4 and 10, the hitch attachment member may comprise weld or adhesive, such as weld 178. In another embodiment, as is shown in FIG. 9, the hitch attachment member 72 may be configured to interface with the ball accepting region of a conventional hitch, and may include ball assembly 73. Advantageously, such an embodiment replaces a conventional hitch ball assembly with an assembly that includes a hitch attachment assembly (as a drop in replacement for a ball of a conventional hitch). In other embodiments, the hitch attachment member may include an opening which permits attachment to the hitch by way of the assembly structure conventionally associated with the ball of the hitch. In either such embodiment, the hitch attachment member interfaces with the ball attachment assembly of a conventional hitch. In yet another embodiment, shown in FIG. 5, stand member 91 may be provided. Stand member 91 includes base attachment member 73 and legs, such as leg 93. Such a component is useful relative to providing the hitch illumination apparatus additional utility and the ability to be used separate and apart from a conventional hitch.

Illumination assembly 16 is shown as comprising lamps 74, 76, and power assembly 78. Lamps 74, 76 are configured for attachment to the distal ends of the respective arm members 22, 24. In the embodiment shown, the lamps are fixed to the distal ends of the arm members. It is contemplated that the lamps may be attached by way of brackets which facilitate the positioning of the individual lamps in a number of different positions relative to the respective arm (i.e., they may be freely movable in multiple degrees of freedom). In other embodiments, it is contemplated that the lamps are releasably attached to the arm members, wherein the lamps can be separated from the arm members and positioned as desired (i.e., the lamps may be detachable or tethered to the arm members). The lamps may comprise high intensity LED lamps, incandescent lamps, fluorescent lamps, among others. The invention is not limited to any particular type of lamp, or intensity thereof. It is further contemplated that the lamps 74, 76 may include a plurality of illumination elements 33 (i.e., numerous bulbs), and that at least some of such bulbs may be coupled with the indicator lights (i.e., brake lights, parking lights, head lights, hi-beam lights, turn signals, fog lights, etc.) to provide additional utility.

Power assembly 78 comprises plug member 79 and wiring 80. Wiring 80 places lamps 74, 76 in electrical communication with plug member 79. Plug member 79 is configured to interface with the power plug commonly positioned proximate or attached to a hitch assembly. As such, the plug member connects the lamps to the electrical system of the vehicle. Of course in other embodiments, the power assembly nay comprise a separate battery assembly associated with the hitch, the hitch body assembly or with the illumination assembly.

It is contemplated that certain embodiments which feature detachable lamps, the lamps may be tethered to the respective arm by way of wiring 80 (which may be encased in a pre-coiled outer wrapping).

Remote viewing assembly 18 is shown in FIG. 6 as comprising at least one of mirror 82 and camera 84. Mirror 82 and/or camera 84 can be mounted to any one of the arms, the base and the bracket assembly. In the case of camera 84, the camera may be coupled (wired or wirelessly) with a viewing monitor positioned at a remote location. The remote viewing assembly permits remote viewing by the user or operator of the vehicle.

In operation, the user attaches the hitch attachment assembly to a hitch. In the embodiment shown in FIG. 1, the hitch attachment member is first attached to the hitch. Next, the base attachment member is configured, in the desired orientation relative to the hitch attachment member.

Once positioned, the user can connect the power assembly 78 to vehicle power (i.e., through the power jack conventionally located proximate the hitch for trailer lighting). Once connected, the apparatus is ready for use.

For example, the user can energize the lamps 74, 76 and adjust the lamps so that they focus light as desired. In particular, the user can adjust each arm individually relative to the positioning structure of each of the arms. For example, the relative angle between the base member and the arms can be controlled by the positioning structure.

Furthermore, by way of lateral adjustment assembly 52, the position of the lamps can be adjusted by adjusting the length of the respective arm. Similarly, by way of vertical adjustment assembly 36, the vertical height of the base member can be selectively increased or decreased as desired, to, in turn, adjust the lamps upwardly or downwardly. Advantageously, the hitch illumination assembly provides illumination to generally non-illuminated areas. Moreover, the hitch illumination apparatus provides enhanced utility by facilitating repeated attachment and detachment as needed.

The foregoing description merely explains and illustrates the invention and the invention is not limited thereto except insofar as the appended claims are so limited, as those skilled in the art who have the disclosure before them will be able to make modifications without departing from the scope of the invention.

What is claimed is:

1. A hitch illumination apparatus, comprising:
   a hitch body assembly, the hitch body assembly including:
      a base member having a first end and a second end; and
      at least one arm member having a proximal end and a distal end, the proximal end positioned proximate the first end of the base member, and wherein the at least one arm member is pivotable relative to the base member;
   a hitch attachment assembly, the hitch attachment assembly including:
      a hitch attachment member capable of attachment to an existing hitch; and
      a hitch body attachment member capable of attachment proximate the second end of the base member; and
   a hitch illumination assembly including at least one lamp associated with the second end of the at least one arm member.

2. The hitch assembly of claim 1 wherein the base member further comprises:
   a first component;
   a second component, wherein the first component and the second component are telescopically associated with each other; and a locking assembly capable of releasably locking the first and second components in a desired telescopic position.

3. The hitch assembly of claim 1 wherein the base member includes a conduit extending at least partially therethrough.

4. The hitch assembly of claim 1 wherein the cross-sectional configuration proximate the second end of the base member comprises a substantially uniform cross-section.

5. The hitch assembly of claim 4 wherein the cross-sectional configuration proximate the second end of the base member comprises a square cross-section.

6. The hitch assembly of claim 1 wherein the at least one arm further comprises:
a proximal component;
a distal component, wherein the distal component and the proximal component are telescopically positionable relative to each other; and
a locking member capable of releasably retaining the proximal component relative to the distal component.

7. The hitch assembly of claim 1 wherein the at least one arm further comprises a pair of arms.

8. The hitch assembly of claim 7 wherein the pair of arms are substantially identically configured.

9. The hitch assembly of claim 1 further comprising a positioning assembly associated with the at least one arm, the positioning assembly facilitating the positioning of the at least one arm at a plurality of rotatable positions relative to the base member.

10. The hitch assembly of claim 1 wherein the base attachment member further comprises a rotation facilitating member, which facilitates the rotation of the base member relative to the base attachment member.

11. The hitch assembly of claim 1 wherein the lamp includes a plurality of elements, at least one of the plurality of elements being electrically coupled with an existing indicator of a vehicle.

12. The hitch assembly of claim 1 further comprising remote viewing assembly associated with the hitch body assembly.

13. The hitch assembly of claim 12 wherein the remote viewing assembly comprises at least one of a mirror and a camera.

14. The hitch assembly of claim 1 wherein the at least one lamp is tethered to the at least one arm.

15. The hitch assembly of claim 1 wherein the positioning assembly comprises a damper having a first end associated with the at least one arm, and a second end associated with at least one of the base member and the hitch attachment assembly.

16. The hitch assembly of claim 1 wherein the hitch attachment member includes a ball, and, wherein the hitch attachment member is structurally configured to couple with a ball attachment member of a conventional hitch.

17. A hitch illumination apparatus comprising:
a hitch body assembly, the hitch body assembly including:
a base member having a first end and a second end; and
at least one arm member having a proximal end and a distal end, the proximal end positioned proximate the first end of the base member, and wherein the at least one arm member is pivotable relative to the base member;
a hitch attachment assembly associated with the at least one base member, the hitch attachment assembly facilitating attachment to an existing hitch; and
a hitch illumination assembly including at least one lamp associated with the second end of the at least one arm member.

18. A hitch illumination apparatus comprising:
a hitch body assembly, the hitch body assembly including:
an attachment assembly;
a base member having a first end and a second end, the first end of the base member being coupled with the attachment assembly; and
at least one arm member having a proximal end and a distal end, the proximal end rotatably coupled with the attachment assembly, to, in turn, facilitate rotational movement of the at least one arm member relative to the base member;
a hitch attachment assembly associated with the at least one base member, the hitch attachment assembly facilitating attachment to an existing hitch; and
a hitch illumination assembly including at least one lamp associated with the second end of the at least one arm member.

* * * * *